United States Patent [19]

McDaniel

[11] Patent Number: 5,747,153
[45] Date of Patent: *May 5, 1998

[54] GLASS AND CERAMIC OBJECTS HAVING DURABLE LUSTROUS COATINGS AND METHODS OF PRODUCING

[76] Inventor: Harry C. McDaniel, 2400 Grandview Ave. #19, Cincinnati, Ohio 45206

[*] Notice: The term of this patent shall not extend beyond the expiration date of Pat. No. 5,366,763.

[21] Appl. No.: 805,033

[22] Filed: Feb. 21, 1997

Related U.S. Application Data

[63] Continuation of Ser. No. 335,070, Nov. 7, 1994, abandoned, which is a continuation-in-part of Ser. No. 68,775, Jun. 1, 1993, Pat. No. 5,366,763, which is a continuation-in-part of Ser. No. 894,826, Jun. 8, 1992, abandoned.

[51] Int. Cl.$^6$ ............... B05D 1/04; B05D 3/02; B32B 5/16; B32B 19/04
[52] U.S. Cl. ............ 428/324; 428/325; 428/336; 428/432; 427/475; 427/486; 427/279; 427/287
[58] Field of Search ............... 427/202, 204, 427/266, 269, 279, 287, 383.5, 397.7, 470, 475, 486; 428/324, 325, 336, 432, 428, 404, 406

[56] References Cited

U.S. PATENT DOCUMENTS

| | | |
|---|---|---|
| 3,087,828 | 4/1963 | Linton . |
| 4,361,622 | 11/1982 | Theisen et al. ............... 428/363 |
| 4,418,099 | 11/1983 | Cuevas et al. ............... 427/229 |
| 4,814,298 | 3/1989 | Nelson et al. ............... 501/17 |
| 5,032,429 | 7/1991 | Diefenbach et al. ............... 427/215 |
| 5,177,124 | 1/1993 | Questal et al. ............... 523/219 |
| 5,280,052 | 1/1994 | Questal et al. ............... 523/219 |
| 5,366,763 | 11/1994 | McDaniel ............... 427/193 |
| 5,368,885 | 11/1994 | Fotiou ............... 427/195 |

FOREIGN PATENT DOCUMENTS

| | | |
|---|---|---|
| 47-29172 | 8/1972 | Japan . |
| 89-033031 | 5/1989 | Japan . |

*Primary Examiner*—Michael Lusignan
*Assistant Examiner*—Fred J. Parker
*Attorney, Agent, or Firm*—Wood, Herron & Evans, L.L.P.

[57] ABSTRACT

Glass objects and glazed ceramic objects have a durable thin lustruous coating of a flux-free and frit-free inorganic based luster pigment particles. An application method comprises initially applying the pigment particles to a surface of the glass or ceramic object at a level of from about 0.1 gram to about one gram per square foot and then heating the surface to a temperature and for a time sufficient to fix the luster pigment particles directly to the surface. The resultant lustrous coating is less than about 25 microns in thickness.

26 Claims, No Drawings

GLASS AND CERAMIC OBJECTS HAVING DURABLE LUSTROUS COATINGS AND METHODS OF PRODUCING

This application is a continuation of application Ser. No. 08/335,070, filed Nov. 7, 1994, abandoned, which is a continuation-in-part of "Luster Pigment Application Methods", Ser. No. 08/068,775, filed Jun. 1, 1993, now U.S. Pat. No. 5,366,763, which is a continuation-in-part of "Luster Pigment Application Methods", Ser. No. 07/894,826, filed Jun. 8, 1992, now abandoned.

This invention relates to methods of applying inorganic based luster pigments to a vitreous surface and lustrous coatings on a vitreous surface. More particularly, the invention relates to a method of applying the luster pigments to a vitreous glaze or overglaze surface of a glass or ceramic object in a manner wherein the luster pigment is securely fixed to the surface and provides a coating having a pleasing lustrous appearance.

BACKGROUND OF THE INVENTION

Luster pigments have a unique appearance. They have a pearlescent appearance which is pleasing to the eye. Those luster pigments which have been widely commercialized are mica flakes coated with a metal oxide such as titanium dioxide and/or ferric oxide. They are described in U.S. Pat. Nos. 3,087,828 and 3,087,829. The pigments are recommended for use in many formulations and have found wide acceptance in automotive paints, printing inks, plastic bottles, cosmetics and simulated pearls. Other luster pigments which are commercially available, though have not been as widely used, have an inorganic platelet-shaped particle such as glass with the metal oxide coating. They are described in U.S. Pat. No. 3,331,699. Organic luster pigments, as described in U.S. Pat. No. 5,026,429, are also available.

Use of the luster pigments in vitreous compositions, however, has been limited. Vitreous compositions, per se, are well known. They are based on ground glass, glass forming materials or a mixture of both. Such compositions can be coatings which are applied to a substrate and then heated or fired to a temperature sufficient to cause the coating components to melt. When cooled, a thin coating of glass is formed on the substrate. The coatings are commonly referred to as vitreous enamels when the substrate is a metal and vitreous glazes when the substrate is a ceramic. The coatings are used to decorate the substrate with color or artistic renditions as well as add to the substrate's durability in terms of scratch and mar resistance, moisture barrier, etc.

The customary and normal procedure for incorporating pigments in vitreous compositions is to include them in the body of the composition's glass component. Alternatively, the pigments are incorporated in a vitreous flux which is applied to a vitreous substrate. In either case, the vitreous composition must be heated to a high temperature to fuse the glass components. It follows that any pigment included in the formulation must be able to withstand the high temperatures and the chemical action of the glass components during fusing. This has not been a problem with many of the pigments which are available. Data sheets provided by the pigment suppliers as well as acquired knowledge of the artisan or manufacturer are sufficient. However, understandably there are certain pigments either because of their color or other visual effect which cannot be used in certain vitreous compositions. It has been found that the luster pigments are not stable at the elevated temperatures experienced. It appears that the glass components attack the pigments at the elevated temperatures. The formed surfaces simply do not have the desired appearance.

The instability problem of luster pigments in vitreous compositions, including coatings and substrate bodies is recognized. U.S. Pat. No. 5,022,923 acknowledges the problem and suggests a solution. The described pigments are provided with a top coating of tin dioxide and/or cerium dioxide. Necessarily, the specially treated luster pigments are more expensive. Additionally, while more stable, their stability is less than ideal. Certain applications of the disclosed luster pigments still do not result in the desired appearance. Furthermore, when the luster pigments are incorporated in a vitreous flux, an inordinate amount of luster pigment is required to obtain proper color intensity. Another drawback is the fact that transparent fluxes must be used for the desired color effects.

In accord with a need, there has been developed methods of imparting a desired luster pigment appearance to glass and ceramic substrates having a vitreous surface. The application methods are economical and practical. The resultant products produced by the methods have the desired pleasing appearance with no disadvantages.

SUMMARY OF THE INVENTION

Luster pigment is applied to a vitreous surface of a glass or ceramic object in a manner whereby the pigment is fixed to the surface without adversely affecting the pigment's appearance. Glass, a ceramic object having a vitreous glaze surface, and a glass or glazed ceramic object having a vitreous overglaze are examples of substrates with vitreous surfaces which are used in the method. The method comprises applying a thin surface coating of an inorganic based luster pigment to the vitreous surface and thereafter heating the surface to a temperature and a time sufficient to fix the pigment to the surface and to fuse the surface.

DETAILED DESCRIPTION OF INVENTION

The invention relates to methods of applying luster pigments to a vitreous surface. The substrates and vitreous surface materials used in the methods as well as the method steps are described in detail in the following paragraphs. It will be appreciated that the described methods are useful to the individual craftsman and hobbyist as well as to industrial plants producing mass quantities of products for consumer use. Thus, the individual craftsman will use the invention in producing small ceramic wares such as vases having a very decorative and pleasing appearance. The industrial plants will utilize the invention in producing consumer items such as plate glass having a pleasing and unique appearance.

Selected substrates having a vitreous surface are used in the method of this invention. The substrates include glass and glazed ceramics. Generally, the substrate is a formed or machined object such as a vase, chinaware, window glass or some other structural object. Glass inherently has a vitreous surface. In other cases, the vitreous surface is a vitreous glaze or vitreous overglaze which overlies a glass or ceramic object. Vitreous glazes and overglazes are well known and commercially available. The text books, "What Every Engineer Should Know About Ceramics", by Solomon Musikant, Marcel-Dekker, 1991 and "Elements of Ceramics", by F. H. Norton, Addison-Wesley, 1970, 2nd Edition, include general formulations as well as specific glazes and overglazes. All are usable in this invention.

The luster pigments used in the method of this invention are inorganic based because of their temperature stability at the temperatures encountered. They have a temperature stability to deformation of at least about 800 degrees Fahrenheit. The pigments are inorganic platelet-shaped particles with a surface coating of at least one metal oxide layer. The pigments are actually transparent inorganic platelets having a coating of a metal oxide on each of the broad faces of the platelet. The optical contribution is made by the metal oxide layers. Thus, each pigment particle behaves like two metal oxide platelets held together by the particle substrate. The particles typically have a length of from about 1 micron to about 180 microns, a width of from about 1 micron to about 180 microns and a thickness of from about 0.1 microns to about 3 microns. Platelet-shaped particles include mica and glass. Metal oxides used as the coatings include titanium dioxide, ferric oxide, zinc oxide, zirconium oxide, nickel oxide, cobalt oxide and chromium oxide.

Mica flakes coated with the titanium dioxide, ferric oxide, or a mixture thereof are preferred because of their ready availability. The mica based pigments with a titanium dioxide surface coating are stable to about 1900 degrees Fahrenheit. The mica based pigments with a ferric oxide surface coating are stable to about 2000 degrees Fahrenheit. The later pigments are especially useful on glass in that they fix at a relatively lower temperature and are more intense. The glass based pigments with a titanium dioxide surface coating are stable to about 1500 degrees Fahrenheit and while less stable than the mica based pigments, have more sparkle. Additionally, the glass platelet-shaped particles of the pigment can be colored with a metal oxide such as the cobalt oxide to enhance the luster effect.

The luster pigments used herein can be stabilized with a top layer of tin dioxide and cerium dioxide as suggested in U.S. Pat. No. 5,022,923. However, the stabilization is not necessary and is less preferred in the method described herein because of an added cost without an appreciably noticeable benefit.

Initially, the luster pigments are applied to the vitreous surface in an amount to give a thin coating after fusing. The thin coating is required for the desired appearance. A luster pigment application rate of from about 0.1 gram per square foot to about one gram per square foot of vitreous surface is used and subsequently fused to give a satisfactory lustrous appearance for most products. It has been found that the resultant thin surface coating of the luster pigment on the vitreous surface of the object gives a very pleasing and unexpected lustrous appearance. The desired thinner coats have excellent luster quality at the reflective angle and good transparency at the transmission angles with good gloss. The surface coating has a thickness of less than about 25 microns. Preferably, sufficient luster pigment is applied to give a coating thickness of from about 0.1 microns to about 25 microns. Excessive pigment application can be tolerated in that any excess which is not fixed to the vitreous surface as further discussed below is simply washed away to leave a surface with the desired coating thickness and pleasing appearance.

In the method herein, the pigments are applied as a powder by dusting or electrostatic spraying onto a wet vitreous surface, or they are applied as a liquid by first dispersing in a liquid carrier such as water or an organic solvent. The pigment dispersed in a liquid is sprayed, brushed or rolled directly onto the vitreous surface. In the case of application to a vitreous overglaze, the pigment can be dusted or air-brushed onto the overglaze. Alternatively, and more preferably, the overglaze is in the form of a decorative screen print or decal composed of an unfused first layer of frit and a luster pigment layer which is applied to a substrate such that the luster pigment layer is on the surface.

The vitreous surface itself on which the luster pigments are applied is a fused solid, unfused solid, or in certain instances as described below is still in the form of a dry or wet unfused vitreous glaze or overglaze. The mesh size of the unfused glaze is about 200 to about 325 to assure an even coat of luster pigment, while the lengths and widths of the pigment particles are about 5 microns to about 25 microns for a satin finish, about 10 microns to about 60 microns for a brilliant finish, and about 10 microns to about 150 microns for sparkle/glitter finishes. Most importantly, the luster pigments are applied as a surface coating and are applied without benefit of a flux or frit material.

The substrate with its vitreous surface and surface applied luster pigment is heated to fix the pigment to the vitreous surface. For the wet vitreous coatings, the substrate is first heated to dry the coating by driving off the liquid carrier prior to the heating step to fix the pigments. In either case, the vitreous surface is heated to a temperature and time sufficient to fix the luster pigment to the surface. The temperature needed is dependent on the vitreous surface. For a glass surface, the temperature used is dependent on the object. With respect to architectural flat glass made by the molten-tin process, the temperature is about 1100 degrees Fahrenheit and the application surface is the non-tin side. This allows the luster pigment to be fixed onto the vitreous surface without deformation of the glass. A very thin luster pigment coating on the surface results in a balance of visual transmission properties through the glass as well as a desired balance of light filtering and reflective properties. With respect to a glass object such as a bottle which is sagged or slumped in a molded shape during production, the luster pigment is applied to the surface and then heated to at least about 1300 degrees Fahrenheit so as to fix the pigment and to sag or slump the glass object in the same step. For a vitreous glaze or a vitreous overglaze surface, the temperature is at least about 180 degrees Fahrenheit, preferably about 260 degrees Fahrenheit to about 380 degrees Fahrenheit above the softening point of the vitreous surface.

About three minutes time span is needed at the elevated temperatures to fix the pigments to the vitreous surface. In general, the greater the fixing temperature difference above the softening point, the lesser the fixing time needed and the thicker the luster coat up to the aforesaid 25 microns.

The softening point for glass is about 400 degrees Fahrenheit to about 1600 degrees Fahrenheit. For a ceramic substrate with a vitreous glaze, the softening point of the coating is about 900 degrees Fahrenheit to about 1800 degrees Fahrenheit. For the unfused vitreous overglaze, the temperature needed to fuse the overglaze is also sufficient to fix the luster pigment to its surface, i.e. about 1000 degrees Fahrenheit to about 1500 degrees Fahrenheit or more preferably about 1060 degrees Fahrenheit to about 1140 degrees Fahrenheit. The softening point or fusing point of the particular vitreous surface is readily determined using published data or is experimentally determined in a routine fashion.

The substrate is cooled once the proper temperature and time have been achieved. The resultant product has a surface coating of the luster pigment fixed to its surface. The pigments are permanently fixed to its surface. The pigments have retained their pleasing appearance, not noticeably affected by the elevated temperatures. The lustrous coating itself has a temperature stability of at least about 800 degrees Fahrenheit. Flat glass in particular has a pleasing appearance and the quality of a reflective architectural glass with the reflective properties enhanced when viewed from the side opposite to its application and at its reflective angle.

The platelet-shaped particles of mica or glass are coated on both sides with metal oxide layers of preferably titanium dioxide and/or ferric oxide. It is theorized that in the method of this invention the metal oxide layer on the underside of the platelet-shaped particle fuses chemically with the vitreous surface of the glass or glazed ceramic object, while the metal oxide layer on the topside remains free from chemical attack to produce the lustrous appearance. It is also further theorized that for the very thin lustrous coatings, there is a thickness of a single luster pigment (i.e. about 0.1 microns to about 3 microns), while for the thicker lustrous coatings (i.e. about 3 microns to less than 25 microns), there is an overlapping of the luster pigments, like fish scales. Above 25 microns, further overlapping of the luster pigments cannot take place and the excess pigment is washed off. When the prior art luster pigments are embedded in the matrix of a vitreous glaze formulation, both metal oxide layers on the platelet-shaped particle of mica or glass are subject to the same chemical activity. The use of more pigment in a glaze formulation in effect allows for a "pigment sacrifice", but is expensive and still does not enjoy the same appearance benefits as enjoyed with the present invention.

A one-step method of fusing the glass components of the vitreous surface coating and fixing the luster pigments to the vitreous surface is possible with the vitreous overglazes. The vitreous overglaze is typically applied as a screen print or decal to the substrate as a layer of unfused frit and a layer of luster pigment with the pigment on the surface. Next, the screen print or decal is heated to a temperature and for a time sufficient to fuse the overglaze components and to fix the luster pigment to the overglaze.

It has been found, however, that a one-step method for a vitreous glaze on a ceramic substrate is not feasible because of the very high temperature and long fusing times needed by these materials to induce the chemical reactions needed. Typical vitreous glazes for ceramics are heated to temperatures at least about 1900 degrees Fahrenheit for fusing. Such materials require the two step method of first fusing at the proper temperature and time, and then luster pigment surface application and fixing as discussed above.

The examples which follow illustrate the methods of the invention.

EXAMPLE I

This example illustrates the method of fixing luster pigments to a vitreous glaze on a ceramic substrate.

A ceramic substrate test tile, about one-half inch in diameter, initially has a liquid opaque black vitreous glaze supplied by American Art Clay., Inc. as AMACO LG-1 applied to its surface, dried and fused at 1915 degrees Fahrenheit. The softening point of the glaze is estimated at about 1436 degrees Fahrenheit.

A luster pigment coating is next applied. The pigment coating is a dispersion of luster pigment based upon mica flakes having a titanium dioxide coating. The pigment is supplied by Mearl Corp. as HI-LITE GREEN 9820C. It is dispersed 50:50 by volume in an aqueous gum solution supplied by Thompson Enamel Co. and identified as KLYR-FIRE. The pigment dispersion is applied to the glazed substrate by brush and then dried. The coated tile is placed in an oven at 1780 degrees Fahrenheit for three minutes, removed, cooled, rinsed and evaluated. This temperature is 344 degrees Fahrenheit above the vitreous glaze's softening point. The luster pigment coating is found to be durable and its appearance excellent as measured by comparison to the printed paint chip from its supplier.

EXAMPLE II

This example illustrates a method of fixing luster pigments to a glass surface wherein the underlying substrate is also glass.

Two small glass substrate test tiles, about one-half inch in diameter, are used. One has a vitreous enamel coating applied and fused at 1517 degrees Fahrenheit, while the other one has no enamel coating. The enamel is Thompson Enamel Co.'s code number 5990, an 80 mesh dry powder opaque black enamel. It has a softening point of 1031 degrees Fahrenheit. The softening point of the uncoated glass is 1094 degrees Fahrenheit.

Each of the two test tiles has a luster pigment coating applied. The coating is as described in Example I. Next, the enamel coated test tile is placed in an oven and heated at 1380 degrees Fahrenheit for three minutes. The other glass test tile is placed in an oven and heated at 1460 degrees Fahrenheit for three minutes. These temperatures are 349 degrees Fahrenheit and 366 degrees Fahrenheit above the respective vitreous surface softening point temperatures.

The tiles are removed from the ovens after the three minutes fixing times, cooled, rinsed and evaluated. Both luster pigment coatings are durable and have a good appearance.

EXAMPLE III

This example illustrates the importance of using the proper temperature differential over the vitreous surface's softening point.

Small high fire, white bisque ceramic test tiles, about ½ inch in diameter, have a vitreous glaze applied. The glaze is a liquid opaque black gloss glaze LG-1 from the American Art Clay Company (AMACO). It is applied by brush to the test tiles. The coated ceramic tiles are dried, heated from room temperature to 1915 degrees Fahrenheit, and allowed to cool in the oven to room temperature to bind the glaze to the ceramic. The softening point of this glaze is estimated at about 1436 degrees Fahrenheit.

A luster pigment coating is next applied to the surface of the vitreous glaze on the ceramic test tiles. The coating is a dispersion of a luster pigment based upon mica flakes having a metal oxide coating. The pigment for this example is HI-LITE GREEN 9820C from the Mearl Corporation. It is dispersed 50:50 by volume in an aqueous gum solution supplied by the Thompson Enamel Company and identified as KLYR-FIRE. The pigment dispersion is applied by brush as a ¼ inch dot to the vitreous surface and then dried before placing in the oven. Firing temperatures and times to fix the luster pigment are varied. Test tiles are cooled, rinsed in water to remove the unfixed pigment, and towel dried before grading for luster quality. The remaining luster pigment is fixed to the vitreous surface. It could not be washed off or scrubbed off.

Samples are graded on a 0 to 4 scale for luster quality at the reflective angle versus the standard color chip for this green luster pigment taken as grade 4. A grade of 0 indicates no luster (i.e. the base glaze), while a grade of 2 is midway between the base glaze and the standard color ship in luster quality. Results are as follows:

| Temperature (degrees Fahrenheit) | Luster Quality Grades (Minutes) | | | Differential over Softening Point (degrees Fahrenheit) |
|---|---|---|---|---|
| | 3 | 6 | 12 | |
| 1460 | 0 | 0 | 1- | 24 |
| 1500 | 0 | 0 | 1- | 64 |
| 1540 | 0 | 0 | 2 | 104 |
| 1580 | 0 | 1 | 2 | 144 |
| 1620 | 1- | 3 | 4 | 184 |
| 1660 | 2 | 4 | 4 | 224 |
| 1700 | 3 | 4 | 4 | 264 |
| 1740 | 3 | 4 | 4 | 304 |
| 1780 | 4 | 4 | 4 | 344 |

The fixing temperature of the luster pigment is taken as the minimum temperature at which the luster quality is equal to the standard at the reflective angle (i.e. grade 4). The differential for the fixing temperature of the luster pigment over the softening point of the vitreous surface differs according to the residence times. At three minutes the differential is 344; at six minutes, 224; and at twelve minutes, 184.

Replacement of HI-LITE GREEN 9820C by other luster pigments from the Mearl Corporation (i.e. INCA GOLD 92226, SUPER SPARKLE) did not change the observed fixing temperature for these tests.

While the invention has been described in detail and illustrated in the examples, various modifications can be made to the invention. All modifications and variations of an obvious nature are considered within the scope of the invention as claimed in the appended claims.

I claim:

1. A method of producing a durable lustrous coating on a vitreous surface of an article comprising:
   (a) applying to the vitreous surface a coating of luster pigment consisting essentially of inorganic platelet-shaped particles having a metal oxide surface coating in an amount to provide a durable lustrous coating on the article of less than about 25 microns in thickness; and
   (b) heating the vitreous surface to a sufficient temperature and for a sufficient time to fix the platelet-shaped particles of luster pigment thereto and provide the durable lustrous coating of less than about 25 microns in thickness.

2. The method of claim 1 wherein the vitreous surface is a glazed ceramic substrate or a glass substrate.

3. The method of claim 1 wherein the vitreous surface is a vitreous overglaze overlying a glass substrate or a ceramic substrate.

4. The method of claim 1 wherein the vitreous surface is fused prior to the application of the luster pigment.

5. The method of claim 1 wherein the vitreous surface is unfused when the surface coating of luster pigment is applied and further wherein the vitreous surface is fused and the luster pigment surface coating is fixed in the same heating step.

6. The method of claim 3 wherein the vitreous overglaze is unfused when the surface coating of luster pigment is applied and further wherein the vitreous surface is fused and the luster pigment surface coating Is fixed in the same heating step.

7. The method of claim 1 wherein the luster pigment is surface applied dry to the vitreous surface.

8. The method of claim 1 wherein the luster pigment is dispersed in a carrier liquid and is then surface applied to the vitreous surface.

9. The method of claim 2 wherein the glaze on the ceramic substrate has a softening point temperature of from about 900° F. (482° C.) to about 1800° F. (982° C.) and the glaze is heated to a temperature at least about 180° F. (82° C.) above its softening point.

10. The method of claim 2 wherein the glass substrate is heated to a temperature of from about 200° F. (93° C.) to about 300° F. (149° C.) below its softening point to prevent deformation of the glass substrate.

11. The method of claim 1 wherein the luster pigments are inorganic platelet-shaped particles of from about 1 micron to about 180 microns in length, about 1 micron to about 180 microns in width and about 0.1 microns to about 3 microns in thickness with a surface coating of at least one metal oxide layer.

12. The method of claim 11 wherein the luster pigments have a temperature stability to at least about 800° F. (427° C.).

13. The method of claim 11 wherein the inorganic platelet-shaped particles of the luster pigments are mica coated with said metal oxide layer.

14. The method of claim 13 wherein the luster pigment is mica flakes coated with titanium dioxide, ferric oxide, or a mixture thereof.

15. The method of claim 11 wherein the inorganic platelet-shaped particles of the luster pigment are glass coated with titanium dioxide, ferric oxide, or a mixture thereof.

16. The method of claim 1 wherein said inorganic platelet-shaped particles contain a flux or frit.

17. The method of claim 1 wherein said inorganic platelet-shaped particles are flux-free or frit-free.

18. The method of claim 1 wherein the individual platelet-shaped particles of the inorganic based luster pigment are applied flat with their metal oxide surface coating in direct contact with the vitreous surface of an article, and further wherein said vitreous surface is heated to a temperature and for a time to provide the durable luster coating without deforming the article.

19. The method of claim 1 comprising the further step of: electrostatically applying said inorganic platelet-shaped particles to the vitreous surface.

20. The method of claim 19 wherein the vitreous surface is a glazed ceramic substrate or a glass substrate.

21. The method of claim 19 wherein the vitreous surface is a glass container or bottle.

22. The method of claim 19 wherein the vitreous surface is a hot glass immediately prior to being blown into a bottle mold.

23. The method of claim 19 wherein the luster pigment is inorganic platelet-shaped particles of from about 1 micron to about 180 microns in length, about 1 micron to about 180 microns in width, and about 0.1 to 3 microns in thickness with a surface coating of at least one metal oxide layer.

24. A glass or ceramic article having a durable lustrous coating on a vitreous surface thereof, wherein the lustrous coating comprises inorganic platelet-shaped luster pigment particles from about 1 micron to about 180 microns in length, about 1 micron to about 180 microns in width, and about 0.1 microns to about 3 microns in thickness and further wherein the platelet-shaped particles are mica or glass with a surface coating of at least one metal oxide layer, the durable lustrous coating having a temperature stability of at least about 800 degrees Fahrenheit and a thickness of less than about 25 microns on the surface of the article.

25. The article of claim 24 wherein the luster pigment particles have a surface coating of titanium dioxide, ferric oxide or a mixture thereof.

26. The article of claim 24 wherein the durable lustrous coating is from about 0.1 micron to about 3 microns in thickness.

* * * * *